US012697874B2

(12) United States Patent
Pankratz

(10) Patent No.: US 12,697,874 B2
(45) Date of Patent: Aug. 4, 2026

(54) HEADS UP DISPLAY SYSTEMS

(71) Applicant: 3M INNOVATIVE PROPERTIES COMPANY, St. Paul, MN (US)

(72) Inventor: Stephan J. Pankratz, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 579 days.

(21) Appl. No.: 18/022,826

(22) PCT Filed: Jul. 27, 2021

(86) PCT No.: PCT/IB2021/056808
§ 371 (c)(1),
(2) Date: Feb. 23, 2023

(87) PCT Pub. No.: WO2022/049426
PCT Pub. Date: Mar. 10, 2022

(65) Prior Publication Data
US 2023/0302901 A1 Sep. 28, 2023

Related U.S. Application Data

(60) Provisional application No. 63/072,960, filed on Sep. 1, 2020.

(51) Int. Cl.
B60K 35/23 (2024.01)

(52) U.S. Cl.
CPC .......... B60K 35/23 (2024.01); B60K 2360/23 (2024.01); B60K 2360/25 (2024.01);
(Continued)

(58) Field of Classification Search
CPC .............. B60K 35/23; B60K 2360/785; B60K 2360/25; B60K 2360/31; B60K 2360/349; B60K 2360/23; B60K 2360/334
(Continued)

(56) References Cited

U.S. PATENT DOCUMENTS

| | | | | |
|---|---|---|---|---|
| 10,509,227 | B2* | 12/2019 | Shi | .......................... G02B 30/25 |
| 2005/0052617 | A1* | 3/2005 | Fujikawa | ............. H04N 13/305 |
| | | | | 359/462 |

(Continued)

FOREIGN PATENT DOCUMENTS

| | | |
|---|---|---|
| JP | 2014010321 A | 1/2014 |
| JP | 2017146424 A | 8/2017 |

(Continued)

OTHER PUBLICATIONS

International Search Report for PCT International Application No. PCT/IB2021/056808, mailed on Oct. 28, 2021, 3 pages.

*Primary Examiner* — Sharrief I Broome
(74) *Attorney, Agent, or Firm* — Jonathan L. Tolstedt

(57) ABSTRACT

An optical system includes an image projector having a light source. A reflective polarizer receives light emitted by the light source at a first incident angle greater than 30 degrees and reflects a portion of the light as a first reflected light. A spatial light modulator receives the first reflected light at a second incident angle greater than 5 degrees and transmits a portion of the first reflected light as a projected image light. A first mirror receives the projected image light at a third incident angle and reflects a portion of the projected image light as a second reflected image light which is received by a second mirror at a fourth incident angle, reflecting a portion of the second reflected image light as a third reflected image light having the viewable image. The light source and spatial light modulator are disposed on a same side of the reflective polarizer.

8 Claims, 2 Drawing Sheets

(52) U.S. Cl.
CPC .... *B60K 2360/31* (2024.01); *B60K 2360/334*
(2024.01); *B60K 2360/349* (2024.01); *B60K*
*2360/785* (2024.01)

(58) Field of Classification Search
USPC ......................................................... 359/19
See application file for complete search history.

(56) References Cited

U.S. PATENT DOCUMENTS

| | | | | |
|---|---|---|---|---|
| 2009/0009594 A1* | 1/2009 | Kawai | ............... | H04N 13/398 |
| | | | | 348/E13.001 |
| 2013/0182197 A1* | 7/2013 | Ludewig | ........... | G02B 27/0101 |
| | | | | 349/11 |
| 2014/0268353 A1* | 9/2014 | Fujimura | .......... | G02B 27/0101 |
| | | | | 359/630 |
| 2017/0045738 A1 | 2/2017 | Kim et al. | | |
| 2017/0045740 A1 | 2/2017 | Hirata et al. | | |
| 2019/0171009 A1 | 6/2019 | Yata et al. | | |

FOREIGN PATENT DOCUMENTS

| | | | |
|---|---|---|---|
| JP | 2019003081 A | 1/2019 |
| WO | 2015102063 A1 | 7/2015 |

* cited by examiner

HEADS UP DISPLAY SYSTEMS

CROSS REFERENCE TO RELATED APPLICATIONS

This application is a national stage filing under 35 U.S.C. 371 of PCT/IB2021/056808, filed Jul. 27, 2021, which claims the benefit of Provisional Application No. 63/072, 960, filed Sep. 1, 2020, the disclosure of which is incorporated by reference in its/their entirety herein.

TECHNICAL FIELD

The disclosure generally relates to optical systems, particularly optical systems for heads up display systems.

BACKGROUND

Electronic displays are provided in many applications to render digital information to a viewer. A heads up display (HUD) allows a viewer to view not only the information, but also a view through the HUD due to the transparent nature of the HUD. Thus, a viewer may be able to view the displayed information while not losing the ability to view the real world through the HUD. HUD systems have been developed particularly for use in high-speed vehicles such as aircraft, but are now increasingly being considered as a feature for other vehicles, including automobiles. In smaller scale, HUD systems are used as goggle lenses or helmet visors, or in other diverse virtual reality (VR) applications. The HUD may be implemented in a variety of surfaces and windows, for example, the front windshield of a vehicle. Thus, for an occupant in the vehicle, vehicle operational information, such as vehicle speed and/or navigation directions, or the like, may be displayed to the occupant on, say, the front windshield accordingly. HUD systems may be situated behind the steering wheel of the vehicle, for example, in or at the vicinity of a dash area of the vehicle, to create the information carrying image that is projected onto the windshield.

SUMMARY

Some aspects of the disclosure relate to an optical system including an image projector for projecting a substantially collimated image light having an image. The image projector includes at least one light source emitting substantially collimated light. A first reflective polarizer receives the substantially collimated emitted light at a first incident angle and reflects at least a portion of the emitted light as a first reflected light. A spatial light modulator having a plurality of pixels for forming the image receives the first reflected light at a second incident angle and transmits at least a portion of the first reflected light as at least a portion of the substantially collimated projected image light having the image. The projected image light has a first polarization state. The optical system includes a first mirror that receives the substantially collimated projected image light at a third incident angle and reflects at least a portion of the projected image light as a second reflected image light having the image. A second mirror receives the second reflected image light having the image at a fourth incident angle and reflects at least a portion of the second reflected image light as a third reflected image light having the image for viewing by a viewer. The at least one light source and the spatial light modulator are disposed on a same side of the first reflective polarizer. The first incident angle is greater than about 30 degrees and the second incident angle is greater than about degrees.

Some other aspects of the disclosure relate to a heads up display (HUD) for forming a virtual image of a projected image for viewing by an occupant of a vehicle. The HUD includes an image projector for projecting an image light having the image. The image projector includes at least one light source emitting substantially collimated light. A first reflective polarizer receives the substantially collimated emitted light at a first incident angle and reflects at least a portion of the emitted light as a first reflected light. A spatial light modulator including a plurality of pixels for forming the image receives the first reflected light at a second incident angle and transmits at least a portion of the first reflected light as the substantially collimated projected image light having the image. The projected image light has a first polarization state. The image projector is substantially centered on a first folded optical axis extending from the at least one light source to the spatial light modulator and includes a first fold angle greater than about 30 degrees. The HUD includes a projection optics for projecting and forming the virtual image of the projected image. The projection optics includes a first mirror for receiving the substantially collimated projected image light at a third incident angle and reflecting at least a portion of the projected image light as a second reflected image light having the image. A second mirror receives the second reflected image light having the image at a fourth incident angle and reflects at least a portion of the second reflected image light as a third reflected image light having the image for viewing by a viewer. A windshield of the vehicle is configured to receive the third reflected image light and reflect a portion of the received image toward the viewer such that the viewer can see the virtual image of the reflected image. The image projector is substantially centered on a second folded optical axis extending from the spatial light modulator to at least the windshield and includes a second fold angle greater about 90 degrees.

BRIEF DESCRIPTION OF DRAWINGS

The various aspects of the disclosure will be discussed in greater detail with reference to the accompanying figures where, FIG. 1 schematically shows a heads up display system according to some embodiments of the disclosure.

The figures are not necessarily to scale. Like numbers used in the figures refer to like components. However, it will be understood that the use of a number to refer to a component in a given figure is not intended to limit the component in another figure labelled with the same number.

DETAILED DESCRIPTION OF ILLUSTRATIVE EMBODIMENTS

In the following description, reference is made to the accompanying drawings that form a part hereof and in which various embodiments are shown by way of illustration. It is to be understood that other embodiments are contemplated and may be made without departing from the scope or spirit of the present description. The following detailed description, therefore, is not to be taken in a limiting sense.

The term heads up display (HUD) is used herein to refer to such display systems, whether employed in the window or windshield of a vehicle such as an aircraft, watercraft, or motor vehicles such as automobiles, trucks, and motorcycles, in smaller scale systems such as goggle lenses or helmet visors, or in other diverse applications.

For instance, HUD systems project an image onto the windshield of a vehicle and allows the viewer (for example, the driver) to view the information in the form of a virtual image. The HUD systems may be configured to display one or more of a vehicle operating information such as vehicle speed, navigation information such as directions and/or a map, ambient information such as temperature, radio station or track listing, communication information such as caller information, and road sign information or restrictions such as an effective speed limit, etc. The HUD system may be situated behind the steering wheel of the vehicle, in or at the vicinity of a dash area of the vehicle, to create the image that is projected onto the windshield, which then reflects the light towards, say, the driver of the vehicle.

A HUD system includes a picture generation unit (PGU) that projects from a lower corner of the HUD onto a cold mirror, which reflects the image toward the main focusing mirror and out onto the windshield, creating a z-shaped beam path. Most PGU projection sources include an array of LEDs with lenslet-type collimators that project toward a display system (such as LCD), which has a diffuser element on its side facing the PGU. A certain throw distance between the LEDs and the diffuser/LCD may be desirable to achieve uniform illumination across the image plane. This throw distance, along with a heat sink provided behind the LED array for thermal management, creates an extended PGU geometry that may increase the HUD volume, which may extend downward into the dash area of the vehicle. Embodiments described herein address these and other challenges.

Some embodiments of the present disclosure describe a HUD system that more effectively utilizes the available space within the HUD and fulfils thermal management, volume reduction and optical efficiency of the system.

Figure 1:
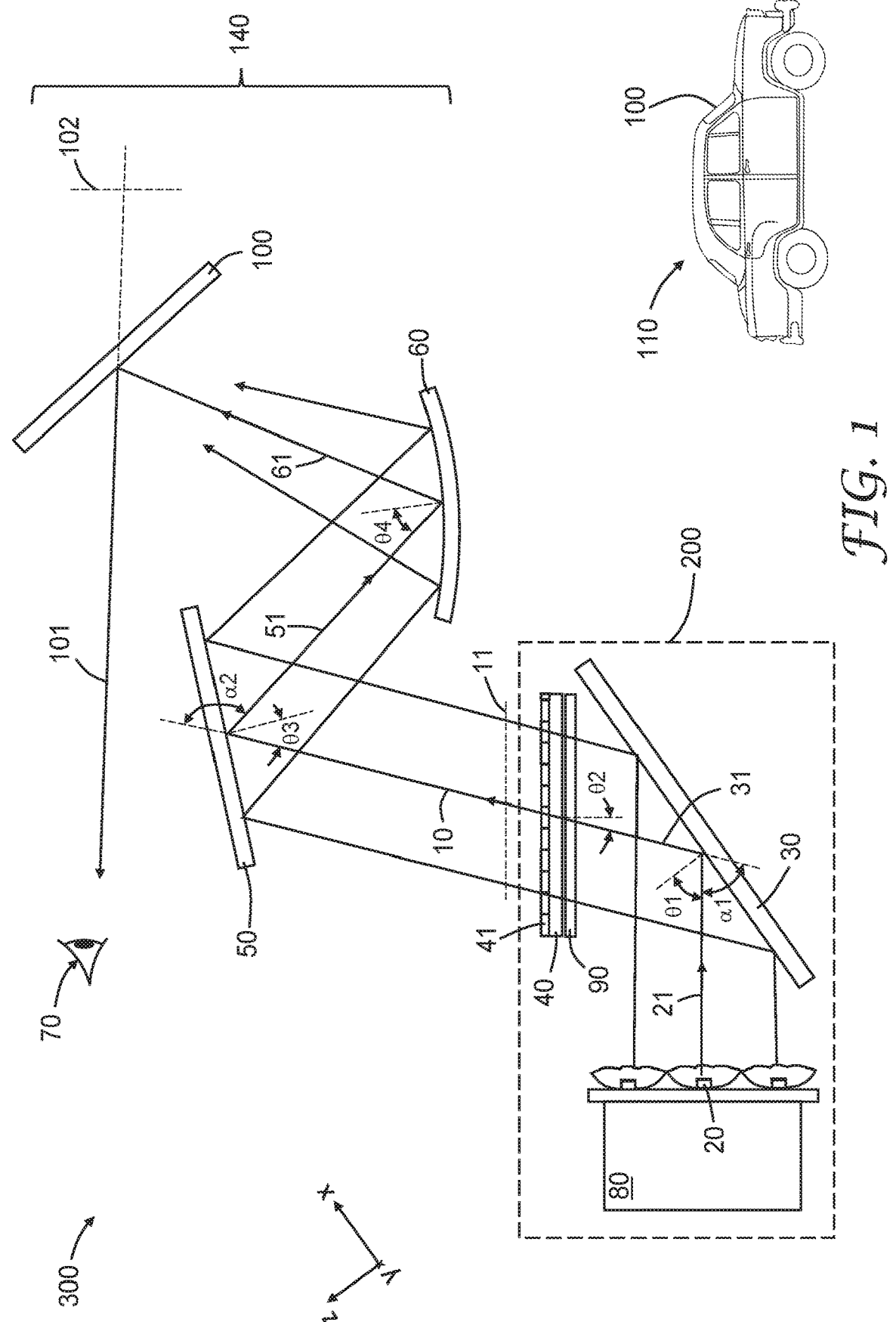

An optical system (300) according to some aspects of the disclosure is illustrated in FIG. 1. The optical system (300) in some embodiments may be a HUD system for forming a virtual image (102) of a projected image (11) for viewing by an occupant (70) of a vehicle (110). The optical system (300) includes an image projector (200) for projecting an image light (10) having an image (11) for viewing by an eye of a viewer (70). In some aspects, the image light may be a substantially collimated image light (10). The optical system may be configured such that the viewer can see a virtual image (102) of the projected image to allow the viewer to view various types of information, such as speed, fuel level, temperature, warnings, directions, etc. on the windshield (100). The image projector (200) includes at least one light source (20) for emitting substantially collimated light (21). In some aspects the light source may include organic light emitting display (OLED), electroluminescent panel, incandescent or phosphorescent light source, CRT, LEDs, and lenses, collimators, reflectors, and/or polarizers. In some embodiments, the image projector (200) may include a heat sink (80) thermally coupled to the at least one light source (20). The heat sink (80) may be constructed as a cooling body thermally coupled to the light source (20) to dissipate the heat emitted from the light source (20).

In some aspects, a divergence angle of the substantially collimated light (21) emitted by the at least one light source (20) may be less than about 10 degrees, or less than about 7.5 degrees, or less than about 5 degrees.

The image projector (200) also includes a spatial light modulator (40) having a plurality of pixels (41) for forming the image (11). In some aspects, a first reflective polarizer (30) may be placed between the at least one light source (20) and the spatial light modulator (40). The first reflective polarizer (30) receives the substantially collimated emitted light (21) emitted by the at least one light source (20) at a first incident angle ($\theta 1$) and reflects at least a portion of the emitted light as a first reflected light (31) toward the spatial light modulator (40). The spatial light modulator (40) receives the first reflected light (31) at a second incident angle ($\theta 2$) and transmits at least a portion of the first reflected light as the substantially collimated projected image light (10) including the image and having a first polarization state or as at least a portion of the substantially collimated projected image light (10) including the image and having the first polarization state.

In some aspects, the first reflective polarizer (30) may generally include materials which transmit light of a first polarization and which reflect light of a second, different polarization. Reflecting polarizers include, by way of example and not of limitation, diffusely reflecting polarizers, multilayer reflective polarizers, and cholesteric reflective polarizers. The first reflective polarizer (30) may be a wide-band reflective polarizer or a notch reflective polarizer. In other instances, the first reflective polarizer (30) may be one or more of an absorbing linear polarizer, a multilayer polymeric reflective polarizer, or a laminate of a reflective polarizer, which substantially transmits light having a first polarization state and substantially reflects light having an orthogonal second polarization state. Substantially uniaxially oriented reflective polarizers are available from 3M Company under the trade designation Advanced Polarizing Film 5 or APF. Other types of multilayer optical film reflective polarizers (e.g., Dual Brightness Enhancement Film or DBEF available from 3M Company) may also be used. Other types of reflective polarizers (e.g., wire-grid polarizers) may also be used.

In some aspects, for substantially normally incident light and for a visible range extending from about 420 nm to about 680 nm, the first reflective polarizer (30) may be said to substantially reflect the incident light if the average reflectance of the first reflective polarizer (30) is greater than about 60%, or greater than 70%, or greater than 80% for a first polarization state (x-axis).

In some embodiments, the at least one light source (20) and the spatial light modulator (40) may be disposed on a same side of the first reflective polarizer (30). In some aspects, the first incident angle ($\theta 1$) may be greater than about 30 degrees, or greater than about 35 degrees, or greater than about 40 degrees, or greater than about 50 degrees. The second incident angle ($\theta 2$) may be greater than about 5 degrees, or greater than about 10 degrees, or greater than about 15 degrees, or greater than about 20 degrees.

In some embodiments, the image projector may include an optical diffuser (90) disposed between the first reflective polarizer (30) and the spatial light modulator (40) to diffuse the reflected light (31) and secure light uniformity. In some aspects, the optical diffuser (90) may be any one of a diffusion film or a microlens array.

The optical system (300) includes a first mirror (50) for receiving the substantially collimated projected image light (10) at a third incident angle ($\theta 3$). The first mirror (50) reflects at least a portion of the projected image light as a second reflected image light (51) having the image (11). In some embodiments, the first mirror (50) may be a high reflectance mirror, having a reflectivity of greater than 99.5%. In some instances, the third incident angle ($\theta 3$) may be between about 20 to 60 degrees. In other instances, the third incident angle (θ3) may be between about 25 to 50 degrees, or about 30 to 45 degrees.

The optical system (300) may also include a second mirror (60) for receiving the second reflected image light (51) having the image (11) at a fourth incident angle (θ4). The second mirror (60) reflects at least a portion of the second reflected image light as a third reflected image light (61) having the image for viewing by a viewer (70). In some embodiments, the second mirror (60) may be a high reflectance mirror, having a reflectivity of greater than 99.5%. In some instances, the fourth incident angle (θ4) may be between about 20 to 60 degrees. In other instances, the fourth incident angle (θ4) may be between about 25 to 50 degrees, or between about 30 to 45 degrees. In some embodiments, a windshield (100) of a vehicle (110), may be configured to receive the third reflected image light (61). A portion (101) of the image received by the windshield (100) may be reflected toward the viewer (70) such that the viewer (70) can see a virtual image (102) of the reflected image.

Figure 2:
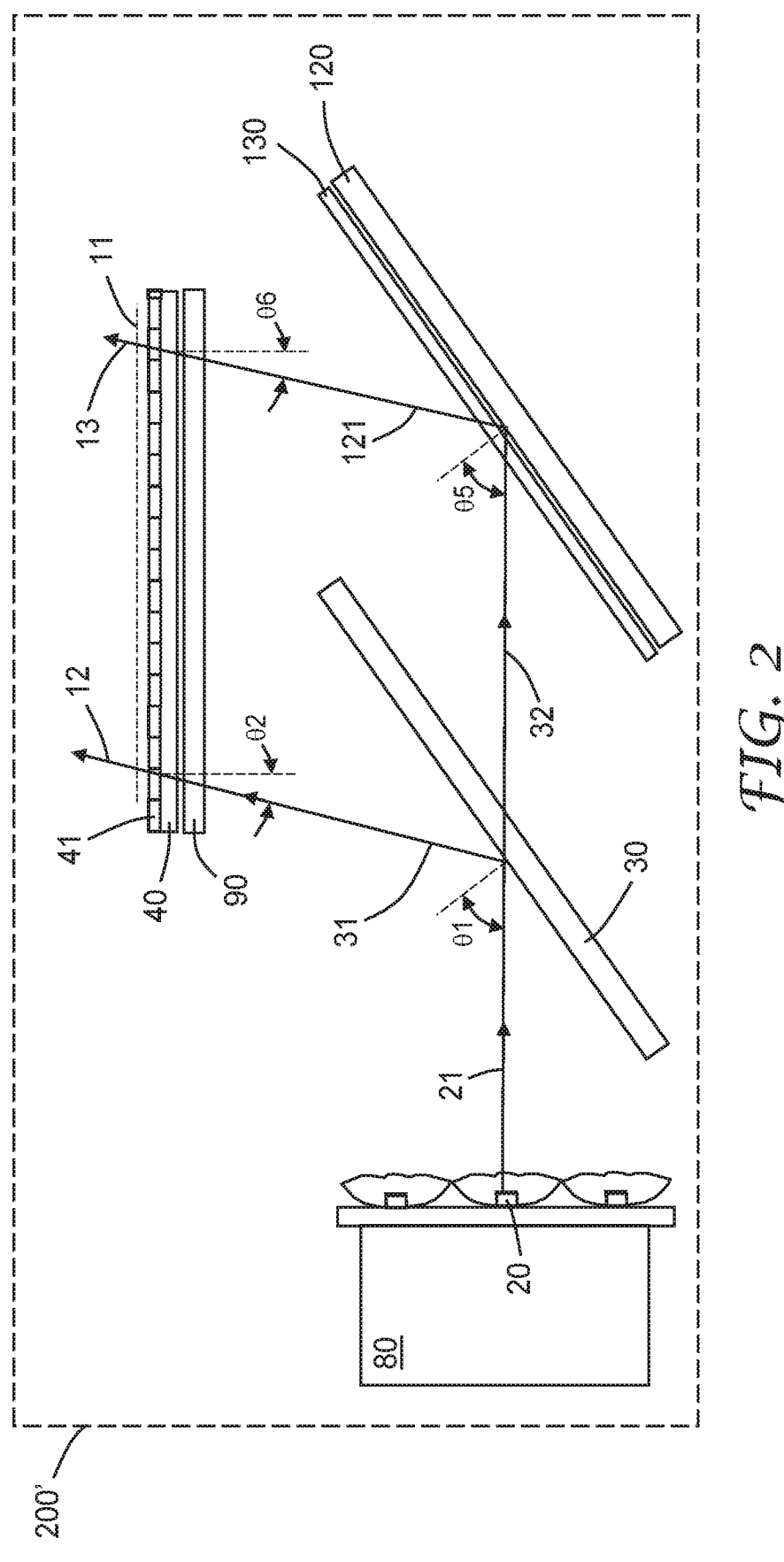
FIG. 2 schematically shows an optical system for a heads up display system according to other embodiments of the disclosure.

According to an embodiment illustrated in FIG. 2, the image projector (200') includes a third mirror (120). The first reflective polarizer (30) may be disposed between the at least one light source (20) and the third mirror (120). In some aspects, the first reflective polarizer (30) reflects a portion of the emitted light as the first reflected light (31) having the first polarization state and transmits a portion of the emitted light as a first transmitted light (32) having an orthogonal second polarization state. The third mirror (120) receives the first transmitted light (32) at a fifth incident angle (θ5) and reflects at least a portion of the first transmitted light as a fourth reflected light (121). In some aspects, the fifth incident angle (θ5) may be greater than about 30 degrees, or greater than about 35 degrees, or greater than about 40 degrees, or greater than about 50 degrees.

According to the embodiment illustrated in FIG. 2, the spatial light modulator (40) may be configured to receive the first reflected light (31) at the second incident angle (θ2). The spatial light modulator (40) transmits at least a portion of the first reflected light as a substantially collimated first projected image light (12) having at least a first portion of the image (11) and having the first polarization state (x-axis). The spatial light modulator (40) may be further configured to receive the fourth reflected light (121) at a sixth incident angle (θ6). In some instances, the sixth incident angle (θ6) may be greater than about 5 degrees, or greater than about 10 degrees, or greater than about 15 degrees, or greater than about 20 degrees. The spatial light modulator (40) transmits at least a portion of the fourth reflected light as a substantially collimated second projected image light (13) having at least a second portion of the image (11) and having the first polarization state (x-axis). The first and second projected image lights (12, 13) combine to form the substantially collimated projected image light (10) (FIG. 1) having the image (11) and having the first polarization state (x-axis).

In some aspects, the first (θ1) and fifth (θ5) incident angles may be within about 5 degrees of each other, or within two degrees of each other. In some other aspects, the second (θ2) and sixth (θ6) incident angles may be within about 5 degrees of each other, or within two degrees of each other.

In some embodiments, the image projector (200') may include a retarder layer (130) disposed between the first reflective polarizer (30) and the third mirror (120). In some instances, the retarder layer (130) may be a quarter-wave retarder. In some aspects, the retarder layer (130) may be a film laminated on the first reflective polarizer (30) or may be a coating applied to the first reflective polarizer (30). For example, the retarder layer (130) may be an oriented polymer film laminated to the first reflective polarizer (30), or a liquid crystal polymer coating on the first reflective polarizer (30). Suitable coatings for forming a quarter wave retarder include, but not restricted to, linear photopolymerizable polymer (LPP) materials and liquid crystal polymer (LCP) materials, as described elsewhere.

In some embodiments, the third mirror (120) may be a high reflectance mirror, having a reflectivity of greater than 99.5%. The light reflected by the third mirror (120) passes through the retarder layer (130) that converts the polarization in a second direction (y-axis) into the polarization in the first direction (x-axis).

Other embodiments include a heads up display (HUD) (300) for forming a virtual image (102) of a projected image (11) for viewing by an occupant (70) of a vehicle (110) as illustrated in FIG. 1. The HUD (300) may include an image projector (200) for projecting an image light (10) having the image (11) and projection optics (140) for projecting and forming the virtual image of the projected image.

The image projector (200) of the HUD projects an image light (10) having an image (11) for viewing by an eye of the occupant (70). In some aspects, the image light may be a substantially collimated image light (10). The image projector (200) includes at least one light source (20) for emitting substantially collimated light (21). In some aspects the light source may include organic light emitting display (OLED), electroluminescent panel, incandescent or phosphorescent light source, CRT, LEDs, and lenses, collimators, reflectors, and/or polarizers. In some embodiments, the image projector (200) may include a heat sink (80) thermally coupled to the at least one light source (20). The heat sink (80) may be constructed as a cooling body thermally coupled to the light source (20) to dissipate the heat emitted from the light source (20).

In some aspects, a divergence angle of the substantially collimated light (21) emitted by the at least one light source (20) may be less than about 10 degrees, or less than about 7.5 degrees, or less than about degrees.

The image projector (200) of the HUD includes a spatial light modulator (40) having a plurality of pixels (41) for forming the image (11). In some aspects, a first reflective polarizer (30) may be placed between the at least one light source (20) and the spatial light modulator (40). The first reflective polarizer (30) receives the substantially collimated emitted light (21) emitted by the at least one light source (20) at a first incident angle (θ1) and reflects at least a portion of the emitted light as a first reflected light (31) toward the spatial light modulator (40). The spatial light modulator (40) receives the first reflected light (31) at a second incident angle (θ2) and transmits at least a portion of the first reflected light as the substantially collimated projected image light (10) including the image and having a first polarization state.

In some aspects, the first reflective polarizer (30) may generally include materials which transmit light of a first polarization and which reflect light of a second, different polarization. Reflecting polarizers include, by way of example and not of limitation, diffusely reflecting polarizers, multilayer reflective polarizers, and cholesteric reflective polarizers. The first reflective polarizer (30) may be a wide-band reflective polarizer or a notch reflective polarizer. In other instances, the first reflective polarizer (30) may be one or more of an absorbing linear polarizer, a multilayer polymeric reflective polarizer, or a laminate of a reflective polarizer, which substantially transmits light having a first polarization state and substantially reflects light having an orthogonal second polarization state. Substantially uniaxially oriented reflective polarizers are available from 3M Company under the trade designation Advanced Polarizing Film 5 or APF. Other types of multilayer optical film reflective polarizers (e.g., Dual Brightness Enhancement Film or DBEF available from 3M Company) may also be used. Other types of reflective polarizers (e.g., wire-grid polarizers) may also be used.

In some aspects, for substantially normally incident light and for a visible range extending from about 420 nm to about 680 nm, the first reflective polarizer (30) may be said to substantially reflect the incident light if the average reflectance of the first reflective polarizer (30) may be greater than about 60%, or greater than 70%, or greater than 80% for a first polarization state (x-axis). In other aspects, for substantially normally incident light and for a visible range extending from about 420 nm to about 680 nm, the first reflective polarizer (30) may be said to substantially transmit the incident light if the average transmittance of the first reflective polarizer (30) may be greater than about 60%, or greater than 70%, or greater than 80% for an orthogonal second polarization state (y-axis).

In another embodiment, the reflective polarizer (30) may be a narrow 3-band notched reflector that produces a higher output color gamut. A high color gamut, narrow-band PGU output could be matched with a similar notched CMF type reflective polarizer that may reduce the load on the spatial light modulator by rejecting IR, substantial amount of the visible energy due to polarization, and a portion of the remaining light of the correct polarization due to wavelength filtering.

In some embodiments, the projection optics include a first mirror (50) a second mirror (60) and a windshield (100) of the vehicle. The first mirror (50) receives the substantially collimated projected image light (10) at a third incident angle (θ3) and reflects at least a portion of the projected image light as a second reflected image light (51) having the image (11). In some embodiments, the first mirror (50) may be a high reflectance mirror, having a reflectivity of greater than 99.5%. In some instances, the third incident angle (θ3) may be between about 20 to 60 degrees. In other instances, the third incident angle (θ3) may be between about 25 to 50 degrees, or about 30 to 45 degrees.

The second mirror (60) receives the second reflected image light (51) having the image (11) at a fourth incident angle (θ4) and reflects at least a portion of the second reflected image light as a third reflected image light (61) having the image for viewing by a viewer (70). In some embodiments, the second mirror (60) may be a high reflectance mirror, having a reflectivity of greater than 99.5%. In some instances, the fourth incident angle (θ4) may be between about 20 to 60 degrees. In other instances, the fourth incident angle (θ4) may be between about 25 to 50 degrees, or between about 30 to 45 degrees. In some embodiments, the windshield (100) of a vehicle (110), may be configured to receive the third reflected image light (61) and a portion (101) of the image received by the windshield (100) may be reflected toward the viewer (70). The viewer (70) may be configured to see a virtual image (102) of the reflected image.

In some embodiments, the image projector (200) may be substantially centered on a first folded optical axis extending from the at least one light source (20) to the spatial light modulator (40) and may, in some aspects, include a first fold angle (α1) greater than about 30 degrees, or greater than about 40 degrees, or greater than 50 degrees. In some other embodiments, the image projector may be substantially centered on a second folded optical axis extending from the spatial light modulator (40) to at least the windshield (100) and may, in some aspects, include a second fold angle (α2) greater than about 90 degrees, or greater than about 100 degrees or greater than 110 degrees. The desirable throw distance between the light source (20) and the spatial light modulator (40) to achieve uniform illumination across the image plane may be maintained while simultaneously folding or bending the image projector (200) into a different direction to reduce the overall HUD volume without compromising luminance uniformity across the image.

The following is a list of exemplary embodiments:

Embodiment 1. An optical system including an image projector for projecting a substantially collimated image light having an image, the image projector including at least one light source emitting substantially collimated light; a first reflective polarizer receiving the substantially collimated emitted light at a first incident angle and reflecting at least a portion of the emitted light as a first reflected light; and a spatial light modulator including a plurality of pixels for forming the image, the spatial light modulator receiving the first reflected light at a second incident angle and transmitting at least a portion of the first reflected light as at least a portion of the substantially collimated projected image light having the image, the projected image light having a first polarization state; a first mirror receiving the substantially collimated projected image light at a third incident angle and reflecting at least a portion of the projected image light as a second reflected image light having the image; and a second mirror receiving the second reflected image light having the image at a fourth incident angle and reflecting at least a portion of the second reflected image light as a third reflected image light having the image for viewing by a viewer, wherein: the at least one light source and the spatial light modulator are disposed on a same side of the first reflective polarizer; the first incident angle is greater than about 30 degrees; and the second incident angle is greater than about 5 degrees.

Embodiment 2. The optical system of embodiment 1, wherein the image projector further includes a heat sink thermally coupled to the at least one light source.

Embodiment 3. The optical system of embodiment claim 1, wherein the image projector further includes an optical diffuser disposed between the first reflective polarizer and the spatial light modulator.

Embodiment 4. The optical system of embodiment 1 further includes a windshield of a vehicle, the windshield configured to receive the third reflected image light and reflect a portion of the received image toward the viewer such that the viewer can see a virtual image of the reflected image.

Embodiment 5. The optical system of embodiment 1, wherein the image projector includes the first reflective polarizer disposed between the at least one light source and a third mirror, such that the first reflective polarizer reflects a portion of the emitted light as the first reflected light having the first polarization state and transmits a portion of the emitted light as a first transmitted light having an orthogonal second polarization state, the third mirror receives the first transmitted light at a fifth incident angle and reflects at least a portion of the first transmitted light as a fourth reflected light, the spatial light modulator receives: the first reflected light at the second incident angle and transmits at least a portion of the first reflected light as a substantially collimated first projected image light having at least a first portion of the image and having the first polarization state; and the fourth reflected light at a sixth incident angle and transmits at least a portion of the fourth reflected light as a substantially collimated second projected image light having at least a second portion of the image and having the first polarization state, the first and second projected image lights combine to form the substantially collimated projected image light having the image and having the first polarization state.

Embodiment 6. The optical system of embodiment 5, wherein the fifth incident angle is greater than about 30 degrees, and the sixth incident angle is greater than about 5 degrees.

Embodiment 7. The optical system of embodiment 5, wherein the image projector further includes a retarder layer disposed between the first reflective polarizer and the third mirror.

Embodiment 8. The optical system of embodiment 5, wherein the first and fifth incident angles are within about 5 degrees of each other.

Embodiment 9. The optical system of embodiment 5, wherein the second and sixth incident angles are within about 5 degrees of each other.

Embodiment 10. The optical system embodiment claim 1, wherein a divergence angle of the substantially collimated light emitted by the at least one light source is less than about 10 degrees.

Embodiment 11. The optical system of embodiment 1, wherein the third incident angle is between about 20 to 60 degrees.

Embodiment 12. The optical system of embodiment 1, wherein the fourth incident angle is between about to 60 degrees.

Embodiment 13. The optical system of embodiment 1, wherein the first incident angle is greater than about degrees.

Embodiment 14. The optical system of embodiment 1, wherein the second incident angle is greater than about 10 degrees.

Embodiment 15. A heads up display (HUD) for forming a virtual image of a projected image for viewing by an occupant of a vehicle, the HUD includes: an image projector for projecting an image light having the image including: at least one light source emitting substantially collimated light; a first reflective polarizer receiving the substantially collimated emitted light at a first incident angle and reflecting at least a portion of the emitted light as a first reflected light; and a spatial light modulator including a plurality of pixels for forming the image, the spatial light modulator receiving the first reflected light at a second incident angle and transmitting at least a portion of the first reflected light as at least a portion of the substantially collimated projected image light having the image, the projected image light having a first polarization state, the image projector substantially centered on a first folded optical axis extending from the at least one light source to the spatial light modulator and including a first fold angle greater than about 30 degrees; and projection optics for projecting and forming the virtual image of the projected image, the projection optics including: a first mirror receiving the substantially collimated projected image light at a third incident angle and reflecting at least a portion of the projected image light as a second reflected image light having the image; and a second mirror receiving the second reflected image light having the image at a fourth incident angle and reflecting at least a portion of the second reflected image light as a third reflected image light having the image for viewing by a viewer; and a windshield of the vehicle, the windshield configured to receive the third reflected image light and reflect a portion of the received image toward the viewer such that the viewer can see the virtual image of the reflected image, wherein the image projector is substantially centered on a second folded optical axis extending from the spatial light modulator to at least the windshield and including a second fold angle greater than about 90 degrees.

Embodiment 16. The HUD of embodiment 15, wherein for a substantially normally incident light and a visible range extending from about 420 nm to about 680 nm, the first reflective polarizer has an average reflectance of greater than about 70% for a first polarization state and an average transmittance of greater than about 70% for an orthogonal second polarization state.

Embodiment 17. The HUD of embodiment 15, wherein the image projector includes the first reflective polarizer disposed between the at least one light source and a third mirror, such that the first reflective polarizer reflects a portion of the emitted light as the first reflected light having the first polarization state and transmits a portion of the emitted light as a first transmitted light having an orthogonal second polarization state, the third mirror receives the first transmitted light at a fifth incident angle and reflects at least a portion of the first transmitted light as a fourth reflected light, the spatial light modulator receives:

the first reflected light at the second incident angle and transmits at least a portion of the first reflected light as a substantially collimated first projected image light including at least a first portion of the image and having the first polarization state; and the fourth reflected light at a sixth incident angle and transmits at least a portion of the fourth reflected light as a substantially collimated second projected image light including at least a second portion of the image and having the first polarization state, the first and second projected image lights combine to form the substantially collimated projected image light including the image and having the first polarization state.

Embodiment 18. The HUD of embodiment 17, wherein the first and fifth incident angles are within about degrees of each other.

Embodiment 19. The HUD of embodiment 17, wherein the second and sixth incident angles are within about 5 degrees of each other.

I claim:

1. An optical system comprising:
    an image projector for projecting a collimated image light comprising an image, the image projector comprising:
    at least one light source emitting collimated light;
    a first reflective polarizer receiving the collimated emitted light at a first incident angle and reflecting at least a portion of the emitted light as a first reflected light; and
    a spatial light modulator comprising a plurality of pixels for forming the image, the spatial light modulator receiving the first reflected light at a second incident angle and transmitting at least a portion of the first reflected light as at least a portion of the collimated projected image light comprising the image, the projected image light having a first polarization state;
    a first mirror receiving the collimated projected image light at a third incident angle and reflecting at least a portion of the projected image light as a second reflected image light comprising the image; and
    a second mirror receiving the second reflected image light comprising the image at a fourth incident angle and reflecting at least a portion of the second reflected image light as a third reflected image light comprising the image for viewing by a viewer, wherein the image projector comprises the first reflective polarizer disposed between the at least one light source and a third mirror, such that the first reflective polarizer reflects a portion of the emitted light as the first reflected light having the first polarization state and transmits a portion of the emitted light as a first transmitted light having an orthogonal second polarization state, the third mirror receives the first transmitted light at a fifth incident angle and reflects at least a portion of the first transmitted light as a fourth reflected light, the spatial light modulator receives:

the first reflected light at the second incident angle and transmits at least a portion of the first reflected light as a collimated first projected image light comprising at least a first portion of the image and having the first polarization state; and the fourth reflected light at a sixth incident angle and transmits at least a portion of the fourth reflected light as a collimated second projected image light comprising at least a second portion of the image and having the first polarization state, the first and second projected image lights combine to form the collimated projected image light comprising the image and having the first polarization state;

the at least one light source and the spatial light modulator are disposed on a same side of the first reflective polarizer;

the first incident angle is greater than 30 degrees; and the second incident angle is greater than 5 degrees.

2. The optical system of claim 1 further comprising a windshield of a vehicle, the windshield configured to receive the third reflected image light and reflect a portion of the received image toward the viewer such that the viewer can see a virtual image of the reflected image.

3. The optical system of claim 1, wherein the fifth incident angle is greater than 30 degrees, and the sixth incident angle is greater than 5 degrees, wherein the first and fifth incident angles are within 5 degrees of each other, and wherein the second and sixth incident angles are within 5 degrees of each other.

4. The optical system of claim 1, wherein a divergence angle of the collimated light emitted by the at least one light source is less than 10 degrees.

5. The optical system of claim 1, wherein the third incident angle is between 20 to 60 degrees, and the fourth incident angle is between 20 to 60 degrees.

6. The optical system of claim 1, wherein the first incident angle is greater than 35 degrees, and the second incident angle is greater than 10 degrees.

7. A heads up display (HUD) for forming a virtual image of a projected image for viewing by an occupant of a vehicle, the HUD comprising:

an image projector for projecting an image light comprising the image comprising:

at least one light source emitting collimated light;

a first reflective polarizer receiving the collimated emitted light at a first incident angle and reflecting at least a portion of the emitted light as a first reflected light; and a spatial light modulator comprising a plurality of pixels for forming the image, the spatial light modulator receiving the first reflected light at a second incident angle and transmitting at least a portion of the first reflected light as at least a portion of the collimated projected image light comprising the image, the projected image light having a first polarization state, the image projector centered on a first folded optical axis extending from the at least one light source to the spatial light modulator and comprising a first fold angle greater than 30 degrees; and projection optics for projecting and forming the virtual image of the projected image, the projection optics comprising:

a first mirror receiving the collimated projected image light at a third incident angle and reflecting at least a portion of the projected image light as a second reflected image light comprising the image; and a second mirror receiving the second reflected image light comprising the image at a fourth incident angle and reflecting at least a portion of the second reflected image light as a third reflected image light comprising the image for viewing by a viewer; and a windshield of the vehicle, the windshield configured to receive the third reflected image light and reflect a portion of the received image toward the viewer such that the viewer can see the virtual image of the reflected image, wherein the image projector is centered on a second folded optical axis extending from the spatial light modulator to at least the windshield and comprising a second fold angle greater than 90 degrees;

wherein for a normally incident light and a visible range extending from 420 nm to 680 nm, the first reflective polarizer has an average reflectance of greater than 70% for a first polarization state and an average transmittance of greater than 70% for an orthogonal second polarization state.

8. The HUD of claim 7, wherein the image projector comprises the first reflective polarizer disposed between the at least one light source and a third mirror, such that the first reflective polarizer reflects a portion of the emitted light as the first reflected light having the first polarization state and transmits a portion of the emitted light as a first transmitted light having an orthogonal second polarization state, the third mirror receives the first transmitted light at a fifth incident angle and reflects at least a portion of the first transmitted light as a fourth reflected light, the spatial light modulator receives:

the first reflected light at the second incident angle and transmits at least a portion of the first reflected light as a collimated first projected image light comprising at least a first portion of the image and having the first polarization state; and the fourth reflected light at a sixth incident angle and transmits at least a portion of the fourth reflected light as a collimated second projected image light comprising at least a second portion of the image and having the first polarization state, the first and second projected image lights combine to form the collimated projected image light comprising the image and having the first polarization state.

* * * * *